(12) United States Patent
Jensen

(10) Patent No.: US 8,110,014 B2
(45) Date of Patent: Feb. 7, 2012

(54) DISTRIBUTOR FOR RINSE AIR

(75) Inventor: Arne Gronbaek Jensen, St. Fuglede (DK)

(73) Assignee: Simtek A/S, Hong (DK)

( * ) Notice: Subject to any disclaimer, the term of this patent is extended or adjusted under 35 U.S.C. 154(b) by 114 days.

(21) Appl. No.: 12/451,102

(22) PCT Filed: Apr. 25, 2007

(86) PCT No.: PCT/DK2007/000194
§ 371 (c)(1),
(2), (4) Date: Feb. 11, 2010

(87) PCT Pub. No.: WO2008/131756
PCT Pub. Date: Nov. 6, 2008

(65) Prior Publication Data
US 2010/0180556 A1      Jul. 22, 2010

(51) Int. Cl.
*B01D 46/04* (2006.01)
(52) U.S. Cl. .............................. 55/284; 55/294; 55/302
(58) Field of Classification Search .................... 55/283, 55/284, 294, 302, 303; 95/273, 279, 280
See application file for complete search history.

(56) References Cited

U.S. PATENT DOCUMENTS
2007/0039290 A1 *  2/2007  Lee ................................ 55/302

FOREIGN PATENT DOCUMENTS
| GB | 1 327 781 | 8/1973 |
| WO | WO 01/03808 | 1/2001 |
| WO | WO 2004/103527 | 12/2004 |

\* cited by examiner

*Primary Examiner* — Duane Smith
*Assistant Examiner* — Minh-Chau Pham
(74) *Attorney, Agent, or Firm* — Day Pitney LLP

(57) ABSTRACT

An air distribution system for providing rinse air to a gas cleaner is provided, which includes a filter housing, a holding plate wherein holes are arranged in concentric circles for holding filter bags or filter elements in the filter housing, filter bags or filter elements, rinse air supply means, and an air distribution device for distributing rinse air. In the system, a tube (6) is arranged rotatable in a rotatable distributor body (109) in the air distribution device (101), which distributor body (109) are connected to tubes (7), and which distributor body (109) includes rotating means (4, 5, 104), and when the distributor body (109) is rotated, tubes (7) are moved from a position above one hole (110) in the holding plate (111) to another hole (110) in the holding plate.

26 Claims, 3 Drawing Sheets

DISTRIBUTOR FOR RINSE AIR

BACKGROUND OF THE INVENTION

The invention relates to an air distribution system for providing rinse air to a gas cleaner, said air distribution system comprising:
a filter housing
a holding plate wherein holes are arranged in concentric circles for holding filter bags or filter elements in the filter housing,
filter bags or filter elements,
rinse air supply, and
an air distribution device for distributing rinse air, The invention further relates to an air distribution device for providing rinse air to a gas cleaner provided with filter bags, said air distribution device comprising:
an air distribution member in form of a hollow member,
a connection to an air supply means for rinse air, To distribute rinse air in an air cleaner or filter it is known to use an air distribution disc. Such a distributing device is disclosed in U.S. Pat. No. 4,220,457 showing a cyclone comprising a cylindrical housing with tangential entrance for dust-containing air. The lower end of the cylindrical housing of the cyclone is tapered is provided with a dust collector. The opposite upper end of the cylindrical housing is divided by an intermediary wall into a lower dust-containing chamber and an upper dust-free chamber. Filter bags are suspended from the intermediary wall extending into the dust-containing chamber, the filter bags being closed at their lower ends and open at their upper ends.

In use the dust-containing air enters the cyclone via the tangential entrance and large particles are separated off in the cyclone. Smaller dust particles flow upwards with the air in the dust-containing chamber. The dust-containing air enters the filter bags from the outside causing the dust to deposit on the filter bags. The now cleaned air flows further upwards within the filter bags into the dust-free chamber and leaves the air cleaner via an outlet for clean air provided in the dust-free chamber.

After some time of filtering the filter bags may have a rather large amount of dust deposited on their outer surfaces. In order to remove the deposited dust, rinsing air is blown through the filter bags in countercurrent, i.e. from the dust-free chamber to the dust-containing chamber through the filter bags.

U.S. Pat. No. 4,220,457 discloses an arrangement for controlling the blowing of rinsing air in such a way that the filter bags are alternately rinsed during operation. The arrangement comprises a plane, disc-shaped air distribution disc having two diametrically opposite apertures. The air distribution disc is positioned over the upper ends of the filter bags, and the two apertures in the air distribution disc are arranged such that they alternately, by rotation of the air distribution disc, is aligned with the filter bags. Above the air distribution disc, tubes for rinsing air is provided, one tubing for each filter bag. The tubes are connected to a device for compressed air.

In use the air distribution disc is rotated slowly, causing filter bags to be rinsed by compressed air in countercurrent each time the apertures of the air distribution disc are aligned with the rinsing air tubes and the filter bags.

The air distribution disc should be in sealing engagement with the rinsing air tubes in order to prevent any leakage of rinsing air when the tubes are not aligned with the apertures of the air distribution disc. In use, however, practice has shown that the sealing engagement is hard to maintain due to the friction between the air distribution disc and the sealing surface of the tubes. In fact, the friction between the air distribution disc and the sealing surface of the tubes provokes the air distribution disc to expand, especially in the area around the apertures, butt since the air distribution disc is an almost closed disc, the outer area of the air distribution disc tends to bend out of the plane of the air distribution disc, causing a gap to arise between the air distribution disc and the sealing surface of the rinsing air tubes. A large amount of rinsing air may be lost because of this gap. This problem is even worse when hot air is rinsed, due to the high temperatures.

Further it is a problem with filters of large diameters if an air distribution disc as described above is used because either it is necessary to use a disc with a relative large material thickness which will result in a heavy distribution disc or it is necessary to supply an effective sealing to the distributor. These two solutions both require driving means for rotating the disc, which driving means thereby tends to be more heavy and space consuming and more expensive.

A solution to this problem has been to provide a rigid supporting plate underneath the air distribution disc, supporting the air distribution disc by rubber supports between the supporting plate and the air distribution disc, trying to force the air distribution disc not to bend out. This solution has the disadvantage that when the sealing means of the rinsing air tubes are worn, the same problem as described above reappears. Further, the rubber supports are not suitable when rinsing hot air.

Another solution is to reduce the diameter of the apertures, causing lesser expansion of the air distribution disc but requiring higher rinsing air pressure.

BRIEF SUMMARY OF THE INVENTION

New Technique

To solve the above problems an air distribution system as well as an air distribution device is provided.

The air distribution system comprises a distributing device, which device is rotatably mounted in an upper bearing and in a lower bearing, whereby the distributing device can rotate about a substantially vertical axis.

The gasses to be treated in the plant are lead by an inlet into a dust chamber and passes through a number of filter bags or filter elements, hereafter referred to as filter bags, into a clean-gas chamber and out of the filter through a clean-gas outlet.

The particles contained in the gas stream will be separated from the gas stream and deposits on the exterior of the filter bags. After a while a layer of particles will accumulate on the exterior of the filter bags and following the difference in pressure between the product side or dust side of the filter bags and the clean side of the filter bags will increase. When the difference in pressure reaches a certain value, a cleaning process of the affected filter bags can be effectuated.

This is achieved with a distributor system having an air distribution device comprising a number of tubes where each tube is capable of connecting one or more holes in the holding plate to a rotatable tube said rotatable tube having means to selectively distributing the rinse air into one or more tubes at a time.

By embodiments disclosed herein, it is possible to direct, or distribute air into a filter bag situated in one of the holes in the holding plate, which holes are positioned in a circle in a radius corresponding to a distance between centre axis of the distribution device and to an end of a tube.

By embodiments disclosed herein, the tubes are positioned in a uniform distance between each other along the holding plate.

By embodiments disclosed herein, filter bags in the holding plate are more easily accessible during maintenance of the filter.

Embodiments disclosed herein achieved an advantageous way of rotating the tubes together with a distributor body to be able to move the tubes from a position above one hole in the holding plate to an other hole in the holding plate, which holes are holding each a filter bag.

By embodiments disclosed herein it is possible to clean more than one filter bag with one tube, where each tube is arranged to clean a group of filters at the time.

By embodiments disclosed herein suitable materials for manufacturing of the tubes. Metal is a possible choice to accommodate higher temperatures and synthetic materials can be a solution to achieve low weight.

By embodiments disclosed herein are achieved by positioning the pressure vessel for supply of rinse air in the clean-gas chamber that the temperature of rinse air is adapted to the temperature in the clean-gas chamber.

Further the object of the present invention is to provide an air distribution device that does not suffer from the disadvantages mentioned above. This is achieved by having the air distribution member being a rotatable tube, at least a part of the rotatable tube being rotatable in relation to the air supply means along a longitudinal axis of the rotatable tube the longitudinal axis being a rotational axis and the rotatable tube having a first end connected to the air supply for receiving rinse air and a second end of the rotatable tube comprising an opening being able to lead rinse air into tubes arranged circumferentially around the rotational axis of the rotatable tube.

By embodiments disclosed herein the second end with the opening of the rotatable tube protrudes in a direction towards the openings of the tubes.

By embodiments disclosed herein the distribution device rotates around a vertical axis.

By embodiments disclosed herein the rotatable tube can distribute rinse air to more than one tube at a time.

Embodiments disclosed herein indicate suitable materials for manufacturing of the rotatable tube. Metal is a possible choice to accommodate higher temperatures and synthetic materials can be a solution to achieve low weight.

Embodiments disclosed herein achieve a flow in the tubes substantially of the same quantity as in the rotatable tube.

By embodiments disclosed herein the a flow in the rotatable tube is substantially higher than in the tubes to ensure a flow of a certain quantity.

By embodiments disclosed herein a surplus of flow in the tubes is achieved compared to the flow in the rotatable tube.

By embodiments disclosed herein an advantageous embodiment of the rotatable tube having a sufficient flow is achieved.

Embodiments disclosed herein describe different methods of delivering rinse air to the filter bags.

By embodiments disclosed herein describe methods of delivering rinse air to more filter bags at the time.

A filter comprising the distributing system can be used for cleaning air by removing particles from an air stream, Such as for example cleaning of exhaust gasses from combustion plants or the like.

The distributing system comprises a distributing device, which device is rotatably mounted in an upper bearing and/or in a lower bearing, whereby the distributing system can rotate about a substantially vertical axis.

In one end of the distributing device a rotatable tube is provided, which rotatable tube is capable of bringing connection between the rinse air supply and one or more holes in the holding plate through one or more tubes.

In an embodiment of the invention all or some of the tubes can divide into more outlet openings in such a way, that it is possible to clean more than one filter bag with one tube. The ends of the tubes can be provided with injectors, which injectors are able to drag surrounding air or gas due to the flow of rinse air from the tubes and through the injectors.

The ends of the tubes can be gathered in groups where each tube is arranged to clean a group of filters at the time.

In another embodiment the rotatable tube can rotate in a distributing chamber, in which chamber openings or gates leads into the distribution tubes and from which chamber the tubes extends and leads to an open end or injector each tube corresponding to a number of openings arranged in a circle.

BRIEF DESCRIPTION OF THE SEVERAL VIEWS OF THE DRAWING(S)

Embodiments will now be discussed in further detail with reference to the accompanying drawings in which.

Figure 3:
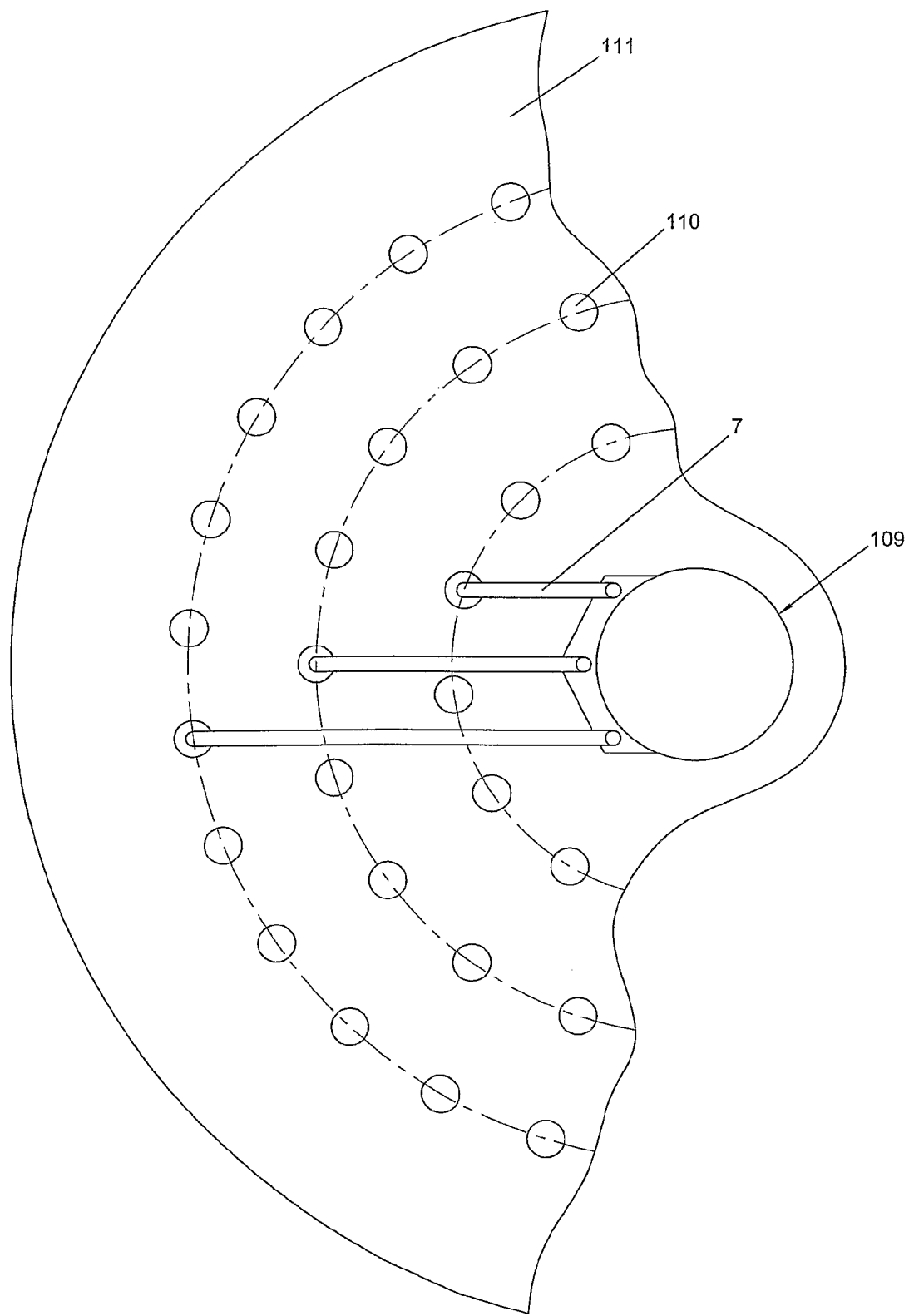

FIG. 3 schematically shows a segment of the holding plate and tubes from the distributor corresponding to the distances to the pattern of holes.

DETAILED DESCRIPTION OF THE INVENTION

Figure 1:
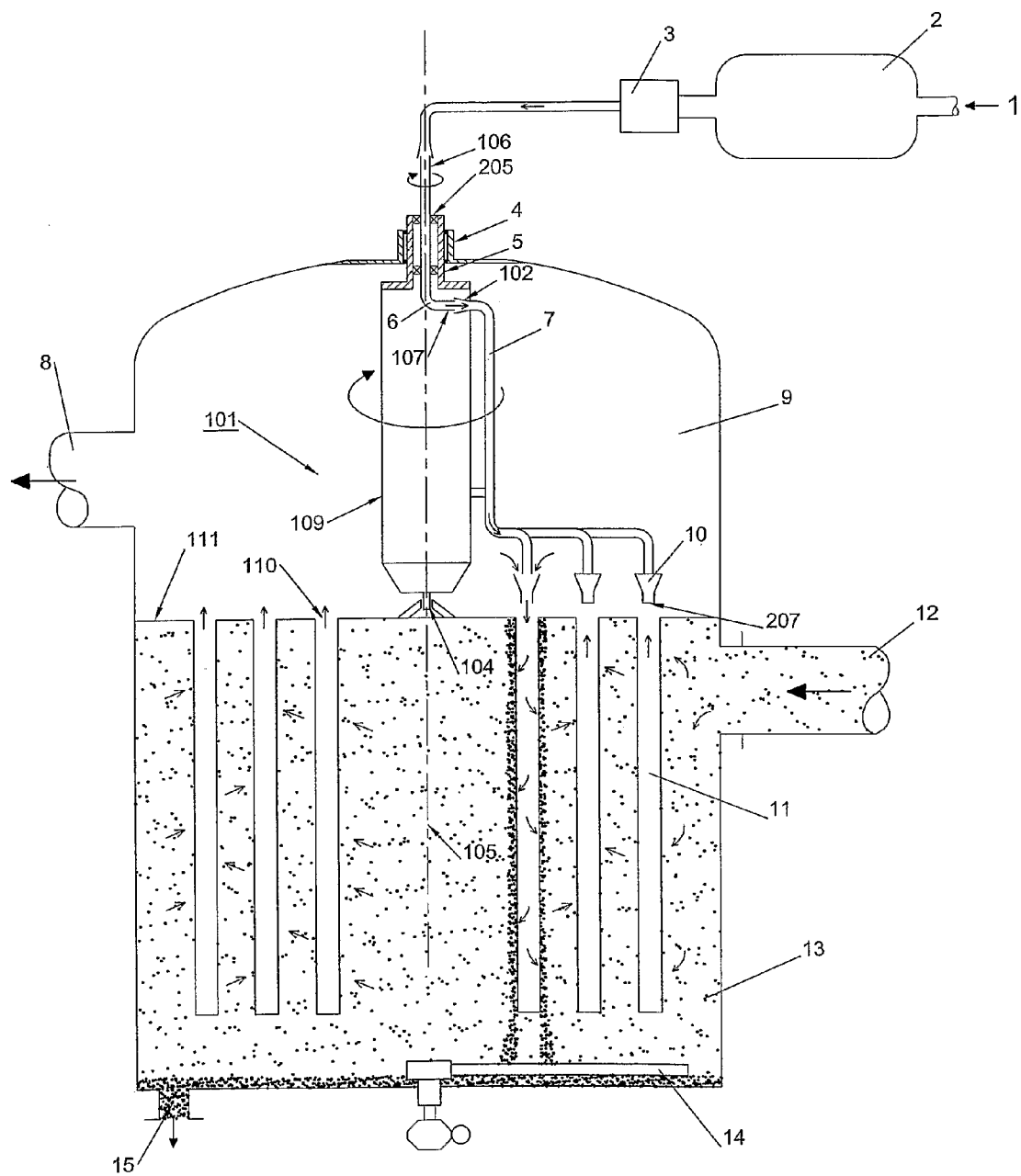
FIG. 1 shows an embodiment of an air distribution system.
Figure 2:
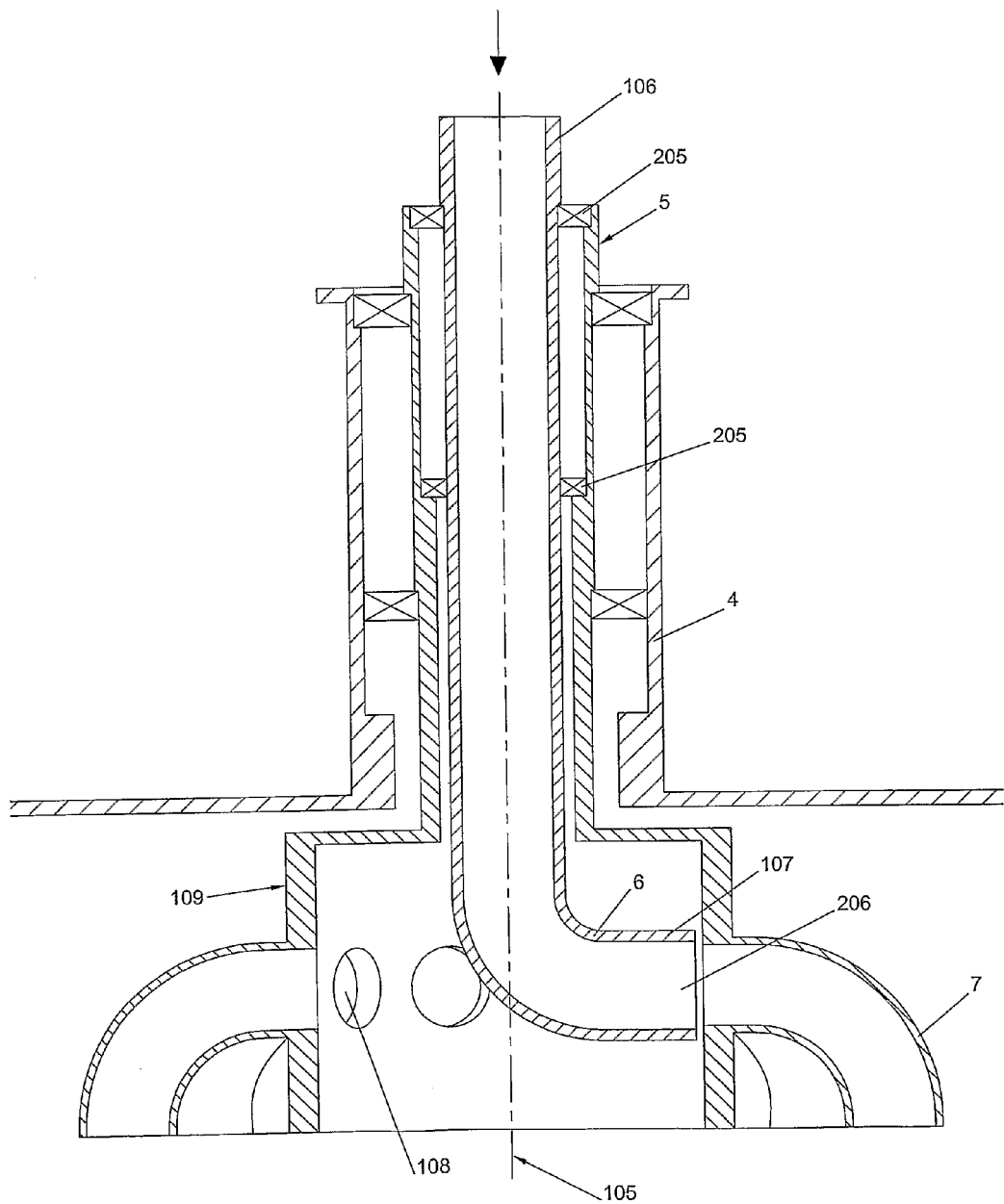
FIG. 2 shows an embodiment of an air distribution device.

FIG. 1 shows an embodiment of an air distributing system with a distributing device 101, which device is rotatably mounted in an upper bearing means 4 and in a lower bearing 104, whereby the distributing device 101 can rotate about a substantially vertical axis 105.

The gasses to be treated in the plant are lead by an inlet 12 into a dust chamber 13 and passes through a number of filter bags or filter elements 11, hereafter referred to as filter bags into a clean-gas chamber 9 and out of the filter through a clean-gas outlet 8.

The particles contained in the gas stream will be separated from the gas stream and deposits on the exterior of the filter bags. After a while a layer of particles will accumulate on the exterior of the filter bags and following the difference in pressure between the product side or dust side of the filter bags and the clean side of the filter bags will increase. When the difference in pressure reaches a certain value, a cleaning process of the affected filter bags can be effectuated.

Compressed air 1 (or a gas corresponding to the gas cleaned in the plant) accumulates in a pressure vessel 2.

In an embodiment of the invention a valve 3 delivers rinse air in form of an air pulse, which air pulse by a tube or piping are lead to a first end 106 of a distribution member, represented by a rotatable tube 6, through the rotatable tube 6 to a second end 107 of the rotatable tube 6, at least a part of the rotatable tube 6 being rotatable in relation to the air supply means along a longitudinal axis 105 of the rotatable tube 6 the longitudinal axis being the rotational axis 105 for a distributor body 109 and for the rotatable tube 6 having a first end 106 connected to the air supply for receiving rinse air and a second end 107 of the rotatable tube 6 comprising an opening 206 being able to lead rinse air into tubes 7 arranged circumferentially in the rotating plane at the second end 107 of the rotatable tube 6.

The rotatable tube 6 is mounted rotatable in a distributor body 109 in bearings, bushings and the like 205 and provided with rotating means (not shown) to rotate the rotatable tube 6.

By directing the rotatable tube 6 to a certain tube 7, the air pulse or rinse air is lead into the tube 7 and from the other end 10 of the tube 7 into a filter bag 11.

In an embodiment the rotatable tube 6 can consist of a longitudinal pipe which pipe is sealed in longitudinal direction in the second end, but with a hole in the cylindrical surface at the end opposite of the air supply of rinse air. In a further embodiment of this embodiment the rotatable tube 6 at least in its second end 107 can have a diameter larger than the diameter of the first end 106. The larger diameter corresponds to the inner diameter of the circumferentially arranged openings 108 of the tubes 7.

In another embodiment a protrusion can protrude from a longitudinal axis 105 of the rotatable tube 6 towards the distribution tubes 7. Protruding from a longitudinal axis 105 of the rotatable tube 6 means that the second end 107 of the rotatable tube 6 protrudes at any angles from the longitudinal direction of the first end 106 of the rotatable tube 6. The angle between the protruding second end 107 and the longitudinal axis 105 will be in the range between 0° and 180°.

Thereby the second end 107 of the rotatable tube 6 protrudes in an angle with a radial component in relation to the rotational axis 105 of the rotatable tube 6.

An injector 10 can be arranged at the end of the tube 7 above the opening of a filter bag. Hereby is achieved, that further gas from the clean-gas chamber 9 is drawn into the opening of the filter bag 11 by the air pulse.

The air pulse is lead further down into the filter bag 11 under the tube end or the injector 10 building up a higher pressure in the bag than the pressure existing in the dust chamber 13 in such a way that the bag is expanded and the particles on the exterior of the filter bag falls to the bottom of the dust chamber 13 from where the particles are lead out through an outlet 15 by way of example by scraping means 14.

In an other embodiment all or some of the tubes 7 can at the end divide into more outlet openings 207 in such a way, that it is possible to clean more than one filter bag 11 with one tube 7. The ends 207 of the tubes 7 can be provided with injectors 10, which injectors 10 are able to drag surrounding air or gas due to the flow of rinse air from the tubes 7, through the injectors 10 and further down into the filter bag 11 under the tube end 207 or the injector 10.

In a further embodiment the tubes 7 are fixed to a distributor body 109, which body 109 at the top comprises the rotatable tube 6 and the upper bearing means 4 and at the bottom of the body 109, the lower bearing 104.

The tubes 7 positioned circumferentially in relation to the rotatable tube 6 can be arranged in such a way, that the end of the tubes 7 ending above the holes in the holding plate 111 holding the filter bags 11, which tubes 7 are spread out above the holding plate 111 distributed with substantially equal mutual distances along the holding plate 111.

To acquire a more expedient configuration of the tubes 7, the tubes 7 are positioned grouped together. This configuration leaves large areas of the holding plate 111 free. Hereby it is more easy to service the filter bags for maintenance, replacement of the filters, filter bags or the like.

When service is completed in a free area, the distributing system is rotated until the remaining un-serviced area is free for service.

By having a number of tubes 7 arranged in different distances from the centre 105 of the distributing system 101 corresponding to each circle of filter bags 11 and eventually ending in an injector 10 it is possible to clean a large number of filter bags 11 spread out in a circle pattern.

By rotating the distributing system 101 along with the tubes 7 by rotating means (not shown) acting in one or more of the bearing points 4, 104 or acting on a hollow shaft 5 positioned on top of the distributor body 109, through which hollow shaft 5 the first end 106 of the rotatable tube 6 runs, it is possible to position a given end 10 of a tube 7 in a position corresponding to any of the filter bags 11 positioned in a circle a distance from the centre axis 105 corresponding to the given tube 7.

The rotatable tube 6 in which at least a part of said tube 6 or the hole tube 6 is rotatable along the longitudinal axis 105 can be rotated by rotating means in such a way that it is possible to position the rotatable tube 6 aligned with the gate or opening to the specific tube 7 positioned above just the filter bag 11 to be cleaned. Then the valve 3 opens and gives in a time specified to the plant access to the air supply 2 or the pressure vessel. When the pressure vessel 2 is under pressure, opening of the valve 3 will give a pulse of air and the filter bag 11 is cleaned.

With the function described above, a given bag can be cleaned at a given time.

It is not necessary to clean the filter bags 11 in a certain order, which can be an advantage if the flow conditions at the inlet of the filter 12 causes an uneven distribution of the particles on the individual filter bags 11.

According to a preferred embodiment the valve 3 is situated outside the clean-gas chamber 9, why the valve 3 is more easy to access during maintenance.

The invention is not limited to an exterior valve. It is possible for the invention to work even if the valve is situated inside the filter housing.

In an embodiment of the invention, it is possible to position the pressure vessel for supply of rinse air in the clean-gas chamber. Hereby is achieved that the temperature of rinse air is adapted to the temperature in the clean-gas chamber.

It is even possible for the invention to work without such a valve. In stead of controlling the air pulse with a valve it is also possible to make use of a continuous air flow and the use the rotatable tube 6 as a kind of valve, well knowing that some air flow is wasted.

It is possible to install the filter with two valves as a precaution if the first valve should fail.

The valve can consist of different types of valves. A valve acting like the air distribution disc disclosed in the prior art, but here the valve dimensions will be rather small, why the problems related to the prior art distribution discs are avoided.

In a further embodiment the rotatable tube 6 and the gates or openings 108 of the tubes 7 are configured as a kind of injector system 102, whereby is achieved that gas from the clean-gas chamber 9 together with rinse air will be dragged into the tube 7 and thereby provide a surplus of flow in the tube 7.

The rotatable tube 6 and the gates or openings 108 of the tubes 7 can also be configured to have substantially the same internal diameter. Even if a gap between the rotatable tube 6 and the gates or openings 108 of the tubes 7 should occur, the system will work. A minor leak will not have a significant effect to the system.

Throughout the description and the claims is used the term "air" referring to the rinse media. It is understood, that the invention is not limited to using air as rinse media. Any kind of gas, gasses or composition of gasses suitable for the process can be used.

The invention claimed is:

1. An air distribution system for providing rinse air to a gas cleaner, said air distribution system comprising:
   a filter housing
   a holding plate wherein holes are arranged in concentric circles for holding filter bags or filter elements in the filter housing,
   filter bags or filter elements,
   rinse air supply means,
   an air distribution device for distributing rinse air,
   wherein a tube (6) is rotatable in relation to the air supply means along a longitudinal axis (105) of the rotatable tube (6), the 15 longitudinal axis being the rotational axis (105) for a distributor body (109) and for the rotatable tube (6) having a first end (106) connected to the air supply for receiving rinse air and a second end (107) of the rotatable tube (6) comprising an opening (206) being able to lead rinse air into tubes (7) arranged circumferentially in a rotating plane at the second end (107) of the 20 rotatable tube (6) and arranged rotatable in a rotatable distributor body (109) in the air distribution device (101) which distributor body (109) are connected to tubes (7) and which distributor body (109) comprises rotating means (4, 5, 104) and when the distributor body (109) is rotated, tubes (7) are moved from a position above one hole (110) in the holding plate (111) to an other hole (110) in the holding plate.

2. An air distribution system according to claim 1, wherein each tube (7) leads to a certain radius from a centre axis (105) of the distributing device (101) corresponding to the radius of one of the concentric circles of holes (110) in the holding plate (111).

3. An air distribution system according to claim 1, wherein the tubes (7) are arranged distributed with substantially equal mutual distances along the holding plate (111).

4. An air distribution system according to claim 1, wherein the tubes (7) are arranged in one or more groups along the holding plate (111).

5. An air distribution system according to claim 1, wherein the tubes (7) are connected to a distributor body (109), which distributor body comprises rotating means (4, 5, 104) and when the distributor body (109) is rotated, the tubes (7) are divided to be positioned above more than one hole (110) and arranged to be moved from a position above one group of holes (110) in the holding plate (111) to an other group of holes (110) in the holding plate (111).

6. An air distribution system according to claim 1, wherein the tubes (7) are made of metal.

7. An air distribution system according to claim 1, wherein the tubes (7) are made of synthetic material.

8. An air distribution system according to claim 7, wherein the synthetic material is plastic.

9. An air distribution system according to claim 1 wherein a pressure vessel (2) for supply of rinse air is positioned in the clean-gas chamber (9).

10. An air distribution device for providing rinse air to a gas cleaner provided with filter bags, said air distribution device comprising:
    an air distribution member in form of a hollow member,
    a connection to an air supply means for rinse air,
    wherein the air distribution member is a rotatable tube (6) arranged rotatable in a rotatable distributor body (109) in the air distribution device (101), at least a part of the rotatable tube (6) being rotatable in relation to the air supply means along a longitudinal axis (105) of the rotatable tube (6) the longitudinal axis (105) being a rotational axis and the rotatable tube (6) having a first end (106) connected to the air supply for receiving rinse air and a second end (107) of the rotatable tube (6) comprising an opening (206) being able to lead rinse air into tubes (7) fixed to the rotatable distributor body (109) and arranged circumferentially around the rotational axis (105) of the rotatable tube (6).

11. An air distribution device according to claim 10, wherein the second end (107) protrudes in an angle with a radial component in relation to the rotational axis (105) of the rotatable tube (6).

12. An air distribution device according to claim 10, wherein the rotational axis (105) is positioned in a substantial vertical direction.

13. An air distribution device according to claim 10, wherein the second end (107) of the rotatable tube (6) comprises more than one opening (206).

14. An air distribution device according to claim 10, wherein the rotatable tube (6) is made of metal.

15. An air distribution device according to claim 10, wherein the rotatable tube (6) is made of synthetic material.

16. An air distribution device according to claim 15, wherein the synthetic material is plastic.

17. An air distribution device according to claim 10, wherein the internal diameter of the opening (206) of the rotatable tube (6) is substantially the same as the internal diameter of the tubes (7).

18. An air distribution device according to claim 10, wherein the internal diameter of the opening (206) of the rotatable tube (6) is greater than the internal diameter of the tubes (7).

19. An air distribution device according to claim 10, wherein the internal diameter of the tubes (7) are greater than the internal diameter of the opening (206) of the rotatable tube (6).

20. An air distribution device according to claim 19, wherein the opening (206) of the rotatable tube (6) forms an injector (102) in cooperation with an opening (108) of a tube (7).

21. An air distribution device according to claim 10, wherein the rotatable tube (6) comprises a curved transition between the first end (106) and the second end (107).

22. An air distribution device according to claim 10, wherein the rinse air is delivered in form of an air pulse.

23. An air distribution device according to claim 22, wherein the air pulse is generated by valve means (3) for providing rinse air.

24. An air distribution device according to claim 10, wherein the rinse air is delivered in form of a constant air supply distributed via the rotatable tube (6) through one or more tubes (7) to the filter bags (11).

25. An air distribution device according to claim 10, wherein the rinse air is delivered through tubes (7), where one or more tubes (7) at the end divides into more outlet openings (207) in such a way, that it is possible to clean more than one filter bag (11) with one tube (7).

26. An air distribution device according to claim 25, wherein the end openings (207) of the tubes (7) are provided with injectors (10).

* * * * *